(12) United States Patent
Jang et al.

(10) Patent No.: US 11,010,046 B2
(45) Date of Patent: May 18, 2021

(54) METHOD AND APPARATUS FOR EXECUTING FUNCTION ON A PLURALITY OF ITEMS ON LIST

(71) Applicant: SAMSUNG SDS CO., LTD., Seoul (KR)

(72) Inventors: You Jin Jang, Seoul (KR); Bo Young Park, Seoul (KR); Jeong Eon Ju, Seoul (KR); Ja Young Youn, Seoul (KR)

(73) Assignee: SAMSUNG SDS CO., LTD., Seoul (KR)

(*) Notice: Subject to any disclaimer, the term of this patent is extended or adjusted under 35 U.S.C. 154(b) by 457 days.

(21) Appl. No.: 15/589,102

(22) Filed: May 8, 2017

(65) Prior Publication Data
US 2017/0322723 A1 Nov. 9, 2017

(30) Foreign Application Priority Data
May 9, 2016 (KR) .................. 10-2016-0056315

(51) Int. Cl.
*G06F 3/048* (2013.01)
*G06F 3/0488* (2013.01)
*G06F 3/0482* (2013.01)

(52) U.S. Cl.
CPC ........ *G06F 3/04883* (2013.01); *G06F 3/0482* (2013.01)

(58) Field of Classification Search
CPC .. G06F 3/0482; G06F 3/04883; G06F 3/0488; G06F 3/0486; G06F 2203/04808; G06F 3/017; G06F 3/048; G06F 3/03547
See application file for complete search history.

(56) References Cited

U.S. PATENT DOCUMENTS

| | | | |
|---|---|---|---|
| 7,554,530 B2 | 6/2009 | Mizobuchi et al. | |
| 9,755,995 B2* | 9/2017 | Underwood, IV | H04L 51/38 |
| 9,817,546 B2* | 11/2017 | Shin | G06F 3/0482 |
| 10,101,901 B2* | 10/2018 | Li | G06F 3/0488 |
| 2004/0119763 A1* | 6/2004 | Mizobuchi | G06F 3/04883 |
| | | | 715/863 |
| 2007/0229471 A1* | 10/2007 | Kim | G06F 3/0488 |
| | | | 345/173 |

(Continued)

FOREIGN PATENT DOCUMENTS

| | | |
|---|---|---|
| JP | 5814875 B2 | 11/2015 |
| KR | 10-1106156 B1 | 1/2012 |

*Primary Examiner* — Justin S Lee
(74) *Attorney, Agent, or Firm* — Sughrue Mion, PLLC

(57) ABSTRACT

Method and apparatus for executing function on a plurality of items on list are provided, one of methods comprises, receiving a touch gesture in a first direction on a first item on a list, determining the first item to be an execution target of a preset function in response to the touch gesture in the first direction, receiving a touch gesture in a second direction on a second item, adding the second item as an execution target of the preset function in response to the touch gesture in the second direction, receiving a touch gesture in the first direction, which is successive to the touch gesture in the second direction, on the added second item and executing the preset function on the first item and the second item in response to the touch gesture in the first direction on the added second item.

14 Claims, 13 Drawing Sheets

(56) References Cited

U.S. PATENT DOCUMENTS

| | | | | |
|---|---|---|---|---|
| 2009/0282332 | A1* | 11/2009 | Porat | G06F 3/0482 |
| | | | | 715/702 |
| 2012/0236037 | A1* | 9/2012 | Lessing | G06F 3/017 |
| | | | | 345/661 |
| 2013/0024821 | A1* | 1/2013 | Lee | G06F 3/0486 |
| | | | | 715/863 |
| 2013/0227480 | A1* | 8/2013 | Kim | G06F 3/04817 |
| | | | | 715/810 |
| 2014/0033032 | A1* | 1/2014 | Reynolds | G06F 3/048 |
| | | | | 715/702 |
| 2014/0181740 | A1* | 6/2014 | Gachoka | G06F 3/0488 |
| | | | | 715/802 |
| 2014/0282254 | A1* | 9/2014 | Feiereisen | G06F 3/04842 |
| | | | | 715/835 |
| 2015/0074606 | A1* | 3/2015 | Melen | G06F 3/04817 |
| | | | | 715/835 |
| 2015/0082217 | A1* | 3/2015 | Tumwattana | G06F 3/0485 |
| | | | | 715/769 |
| 2015/0212667 | A1* | 7/2015 | Holt | G06F 3/0482 |
| | | | | 345/173 |
| 2015/0293676 | A1* | 10/2015 | Avrahami | G06F 3/0484 |
| | | | | 715/720 |
| 2015/0346916 | A1* | 12/2015 | Jisrawi | G06F 3/04817 |
| | | | | 715/752 |
| 2016/0054887 | A1* | 2/2016 | Tumwattana | G06F 3/0488 |
| | | | | 715/810 |
| 2016/0299657 | A1* | 10/2016 | Howarth | G06F 3/0488 |
| 2018/0136834 | A1* | 5/2018 | Tumwattana | G06F 3/04883 |
| 2018/0367491 | A1* | 12/2018 | Agrawal | H04L 51/24 |

* cited by examiner

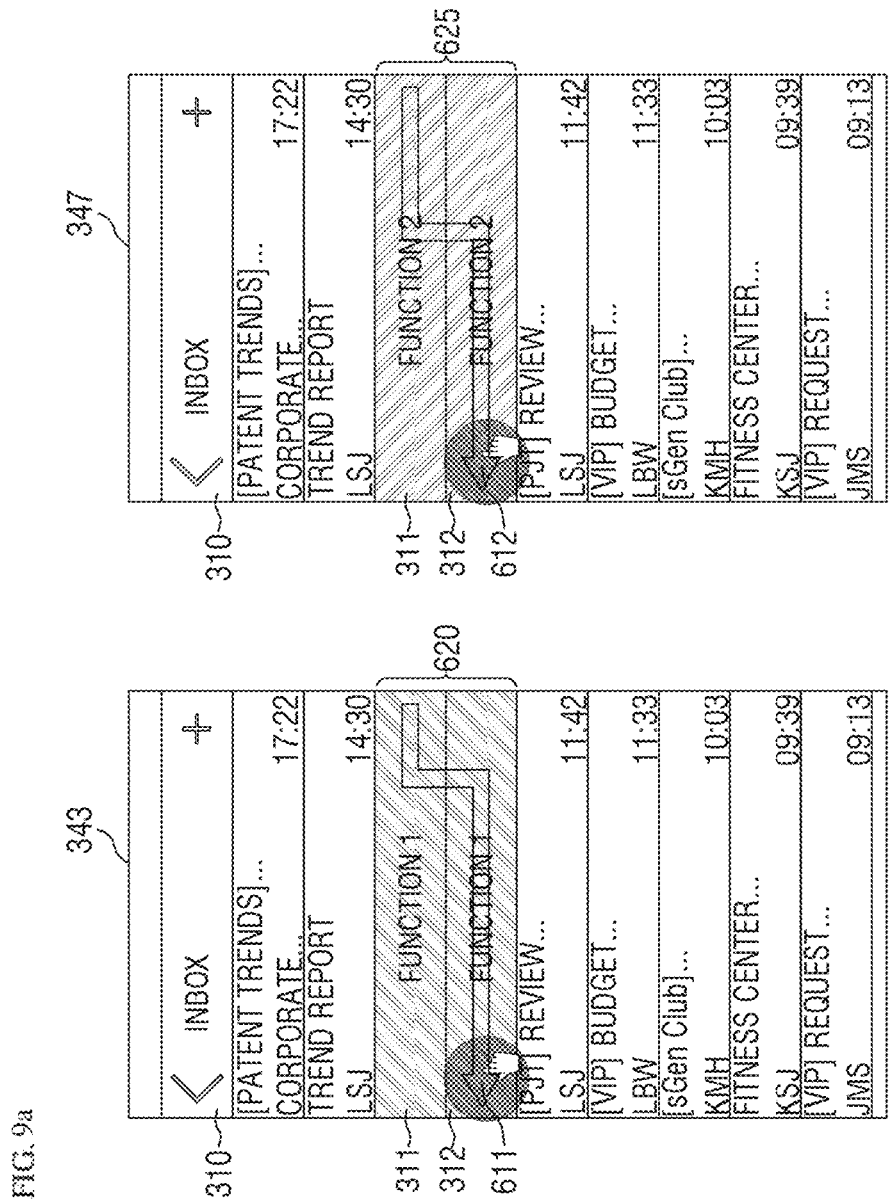

METHOD AND APPARATUS FOR EXECUTING FUNCTION ON A PLURALITY OF ITEMS ON LIST

This application claims the benefit of Korean Patent Application No. 10-2016-0056315, filed on May 9, 2016, in the Korean Intellectual Property Office, the disclosure of which is incorporated herein by reference in its entirety.

BACKGROUND

1. Field

The present inventive concept relates to a method and apparatus for executing a function on a plurality of items on a list, and more particularly, to a method and apparatus for executing a function on a plurality of items on a list at a time in response to a touch gesture.

2. Description of the Related Art

A touch-based device provides various functions for processing displayed items on a list. For example, a delete function or a mark-as-read function may be executed on a message on a mail list or a chat item on a chat list in response to a touch gesture input to the touch-based device.

In addition, there is provided a method of easily executing various functions on an item on a list using a touch gesture. The various functions include a set-as-favorite function, a pin fixing function and an announcement setting function in addition to the delete function and the mark-as-read function.

However, even if the above method is used, after a specific function is executed on one item on a list by inputting a touch gesture to the one item, the touch gesture should be repeatedly input to other desired items on the list in order to execute the same function on the desired items. That is, there is no method of executing a specific function on a plurality of items on a list at a time.

This problem occurs not only in a touch-based device but also in a computing device having a separate input device. For example, to execute, at a time, a specific function on a plurality of items on a list displayed on a monitor, a user has to check a check box for each item using a keyboard or a mouse.

SUMMARY

Aspects of the inventive concept provide a method and apparatus for selecting a plurality of items on a list at a time by inputting a touch gesture.

Aspects of the inventive concept also provide a method and apparatus for executing the same function on a plurality of items selected at a time from a list.

Aspects of the inventive concept also provide a method and apparatus selecting a plurality of items separated from each other on a list by changing the direction of a touch gesture.

Aspects of the inventive concept also provide a method and apparatus for executing the same function on a plurality of items separated from each other on a list.

However, aspects e inventive concept are not restricted to the one set forth herein. The above and other aspects of the inventive concept will become more apparent to one of ordinary skill in the art to which the inventive concept pertains by referencing the detailed description of the inventive concept given below.

In some embodiments a method for executing function on a plurality of items on list, the method comprises, receiving a touch gesture in a first direction on a first item on a list, determining the first item to be an execution target of a preset function in response to the touch gesture in the first direction, receiving a touch gesture in a second direction on a second item, adding the second item as an execution target of the preset function in response to the touch vesture in the second direction, receiving a touch gesture in the first direction, which is successive to the touch gesture in the second direction, on the added second item and executing the preset function on the first item and the second item in response to the touch gesture in the first direction on the added second item.

In some embodiments, a apparatus for executing function on a plurality of items on list, the apparatus comprises, a display unit which displays a list comprising one or more items and a control unit which determines a first item on the list to be an execution target of a preset function when a touch gesture in a first direction is input to the first item through the display unit, adds a second item as an execution target of the preset function when a touch gesture in a second direction is input to the second item through the display unit, and controls the preset function to be executed on the first item and the second item when a touch gesture in the first direction, which is successive to the touch gesture in the second direction, is input to the added second item through the display unit.

BRIEF DESCRIPTION OF THE DRAWINGS

These and/or other aspects will become apparent and more readily appreciated from the following description of the embodiments, taken in conjunction with the accompanying drawings in which:

FIGS. 8, 9A and 9B illustrate a method of executing each of a plurality of functions in response to a touch gesture, which is referred to in some embodiments;

DETAILED DESCRIPTION

In the present specification, a list denotes a set of information including a plurality of items. Examples of the list may include a mail list, a moving image list, a voice file list, a chat room list, a message list, a photo list, a schedule list, and a memo list.

In the present specification, a plurality of items on the list may have directionality. For example, the items on the list may be a plurality of horizontal rows arranged in a vertical direction. For example, each of the items may be content such as a mail, a moving image, a voice file, a chat room, a message, a photograph, a schedule, or a memo.

Figure 1:
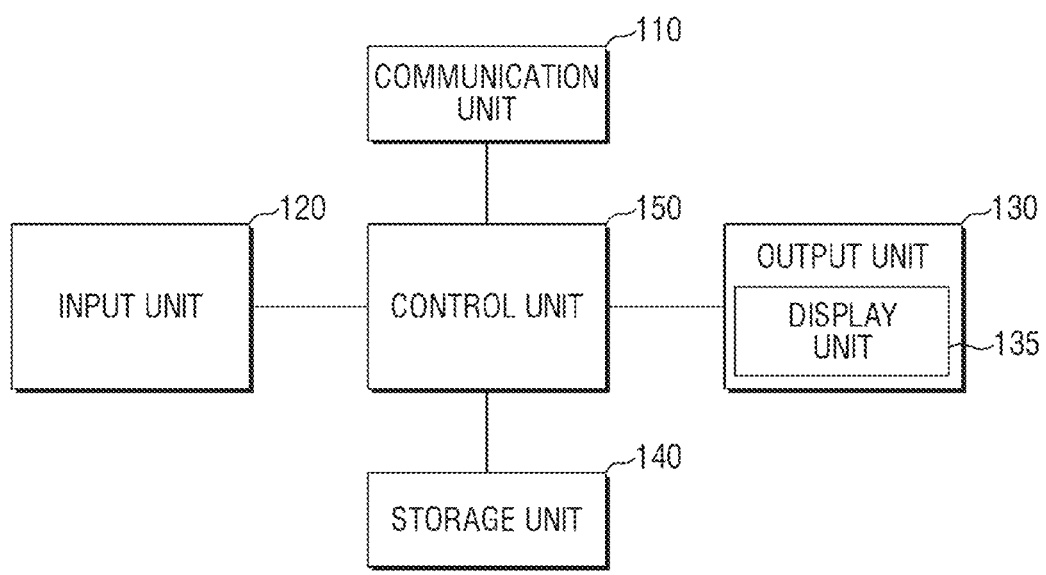
FIG. 1 is a block diagram of an apparatus for executing a function on a plurality of items on a list according to an embodiment.

The configuration and operation of an apparatus for executing a function on a plurality of items on a list will now be described in detail with reference to FIG. 1. FIG. 1 is a block diagram of an apparatus for executing a function on a plurality of items on a list according to an embodiment. For ease of description, the apparatus for executing a function on a plurality of items on a list will hereinafter be abbreviated as a function execution apparatus.

The function execution apparatus illustrated in FIG. 1 may be a touch-based mobile computing device. For example, the function execution apparatus according to the embodiment may be a touch-based smartphone, laptop computer, digital broadcasting terminal, personal digital assistant (PDA), portable multimedia player (PMP), navigation device, slate PC, tablet PC, or wearable device (e.g., a smartwatch).

However, it should be noted that the function execution apparatus of the inventive concept is not limited to the above-mentioned examples and may also be a fixed computing device such as a digital TV, a desktop computer, or a digital signage.

Referring to FIG. 1, the function execution apparatus may include a communication unit 110, an input unit 120, an output unit 130, a storage unit 140, and a control unit 150.

The communication unit 110 may receive a social networking service (SNS) message, a multimedia messaging service (MMS) message, an E-mail, multimedia content, etc. from an external device. In addition, the communication unit 110 may transmit synchronization information about the processing of an item on a list according to an embodiment to the external device.

The communication unit 110 may include a mobile communication module and a wireless communication module to communicate with an external device as described above. In addition, when the function execution apparatus is a fixed computing device, the communication unit 110 may include a wired Internet module.

The input unit 120 receives various settings from a user of the function execution apparatus. To this end, the input unit 120 may include a user input module such as a push button, a touch pad, or a touch screen. The input unit 120 may further include a camera for receiving image information and a microphone for receiving audio information. The image information or the audio information may constitute a list according to an embodiment.

The output unit 130 generates an output related to a visual, auditory or tactile sense. In particular, according to an embodiment, the output unit 130 may include a display unit 135. The display unit 135 may form a mutual layer structure with a touch sensor or may be integrally formed with the touch sensor to be realized as a touch screen. The touch screen may provide an output interface between the function execution apparatus and the user. The touch screen may also function as the input unit 120 to provide an input interface between the function execution apparatus and the user.

In particular, when the display unit 135 is implemented as the touch screen, the touch screen may sense not only a touch gesture input using the user's finger but also a touch vesture input using a touch pen, a stylus pen or a pointer. In addition, the touch screen may sense not only a touch gesture input while in contact with the surface of the touch screen, but also a proximity touch gesture input at a certain distance from the touch screen. To this end, the touch screen may further include a proximity sensor.

Examples of the touch gesture may include a short touch (or a tap), a long touch, a multi touch, a drag touch, a flick touch, a pinch-in touch, a pinch-out touch, a swipe touch, and a drag touch.

The storage unit 140 stores various data, commands, and/or information. The storage unit 140 may store one or more programs for providing a method of executing a function on a plurality of items on a list according to embodiments. In particular, the storage unit 140 may store the result of executing a function on a plurality of items using a method according to an embodiment.

The storage unit 140 may temporarily or non-temporarily store data received from an external device, data input by the user, or the operation result of the control unit 150. The storage unit 140 may include a nonvolatile memory such as a read only memory (ROM), an erasable programmable ROM (EPROM), an electrically erasable programmable ROM (EEPROM) or a flash memory, a hard disk, a removable disk, or any type of computer-readable recording medium well known in the art to which the inventive concept pertains. In FIG. 1, the storage unit 140 is illustrated as a separate component. However, the storage unit 140 can also be integrated with the control unit 150 and included accordingly in the function execution apparatus.

The control unit 150 controls the overall operation of each component of the collision avoidance apparatus 100. The control unit 150 may include a central processing unit (CPU), a micro-processor unit (MPU), a micro-control unit (MCU), or any type of processor well known in the art to which the inventive concept pertains. In addition, the control unit 150 may perform an operation on at least one application or program for executing a method according to embodiments. The specific operation of the function execution apparatus under the control of the control unit 150 will be described later with reference to FIGS. 3 through 12.

In FIG. 1, the communication unit 110, the input unit 120, the output unit 130, the storage unit 140, and the control unit 150 have been described as components of the function execution apparatus. However, according to an embodiment, the function execution apparatus may also include only the display unit 135 and the control unit 150.

Embodiments of the inventive concept will hereinafter be described in detail based on the above description of FIG. 1.

Figure 2:
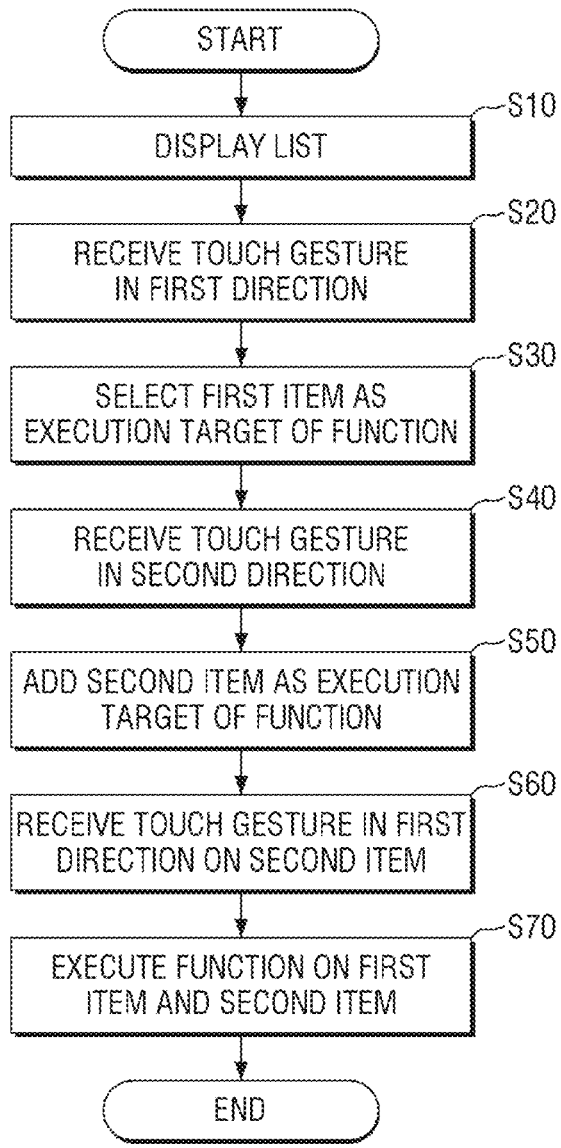
FIG. 2 is a flowchart illustrating a method of executing a function on a plurality of items on a list according to an embodiment.

FIG. 2 is a flowchart illustrating a method of executing a function on a plurality of items on a list according to an embodiment. Each operation of FIG. 2 may be performed by the function execution apparatus described above with reference to FIG. 1. In addition, a case where the display unit 135 is a touch screen will be described below as an example.

Referring to FIG. 2, the function execution apparatus may display a list including a plurality of items on the display unit 135 (operation S10).

In a state where the list is displayed, the function execution apparatus may receive a touch gesture in a first direction on one item on the list (operation S20). For example, if the items on the list are arranged in the form of horizontal rows, the first direction may be a horizontal direction, especially, a right-to-left direction.

In response to the touch gesture in the first direction, the function execution apparatus may determine the one item to be an execution target of a preset function (operation S30).

Here, the preset function is a function preset in the function execution apparatus in relation to an attribute of the one item.

For example, if the list is a list of received mails, the one item may be a single received mail, and the preset function may include a mail delete function, a mark-as-read function, a set-as-favorite function, a function of setting a location fixing pin for a mail on a list, a function of setting a mail reception alarm, a function of moving a mail to a separate mail box, and a function of replying to a mail.

Alternatively, if the list is a list of multimedia content, the one item may be multimedia content, and the preset function may include a command for reproducing a multimedia content item, a function of moving multimedia content to a specific folder, and a function of creating a separate folder including multimedia content.

Next, the function execution apparatus may receive a touch gesture in a second direction on another item different from the one item (operation S40). Here, the second direction may be a direction different from the first direction. If the items on the list are arranged in the form of horizontal rows as in the above example, the second direction may be the vertical direction.

Hereinafter, the one item will be referred to as a first item in order to distinguish the one item from the another item added as an execution target of the preset function by the touch gesture in the second direction. In addition, the another item will be referred to as a second item.

The touch gesture in the second direction may be a touch gesture successive to the touch gesture in the first direction input in operation S20. That is, the touch gesture in the second direction may be a touch gesture that is continued from the touch gesture in the first direction by changing the input direction of the touch gesture from the first direction to the second direction in a state where the touch gesture in the first direction is input and where a touch contact is maintained.

When the items on the list are arranged in the form of horizontal rows as in the above example, a user may input the touch gesture of the first direction to the first item by a certain distance in the right-to-left direction. In addition, the user may not release the touch contact on the display unit 135 after performing the touch gesture of the first direction by the certain distance. In this state, if the user performs a touch gesture in the vertical direction on the list, for example, performs a downward touch gesture, the downward touch gesture may be included in the touch gesture in the second direction according to an embodiment. Also, in this case, the second item may be an item located immediately below the first item.

According to an embodiment, the touch gesture in the second direction input in operation S40 may also be a touch gesture performed in a state where the touch contact is released after the touch gesture in the first direction is input in operation S20. That is, after the first item is determined to be an execution target of the preset function by the touch gesture in the first direction, the touch contact may be released. Then, when the user inputs the touch gesture in the second direction to the second item, the function execution apparatus may identify the touch gesture in the second direction as an input for expanding the execution target of the preset function to the second item.

Referring again to FIG. 2, the function execution apparatus may add the second item as an execution target of the preset function in response to the touch gesture in the second direction (operation S50). In this case, the second item may be one or more items. That is, in the above example, when the touch gesture in the second direction is input on a plurality of items, the second item may include a plurality of items on a path along which the touch gesture in the second direction passes.

Next, in a state where a touch contact by the touch gesture in the second direction is maintained, the function execution apparatus may receive a touch gesture in the first direction on the added second item in succession to the touch gesture in the second direction (operation S60). That is, in the above example, the user may not release the touch contact on the display unit 135 after inputting the touch gesture of the second direction in the downward direction by a certain distance on the list. Here, the user may input a touch gesture in the first direction, that is, in the right-to-left direction at a point where the certain distance ends.

In this case, the function execution apparatus may execute the preset function on the first item and the second item in response to the touch gesture in the first direction on the added second item (operation S70).

The contents described in FIGS. 1 and 2 will be described in detail again with reference to specific examples of FIGS. 3 through 12. It will hereinafter be assumed that the list is a received mail list 310.

Figure 3:
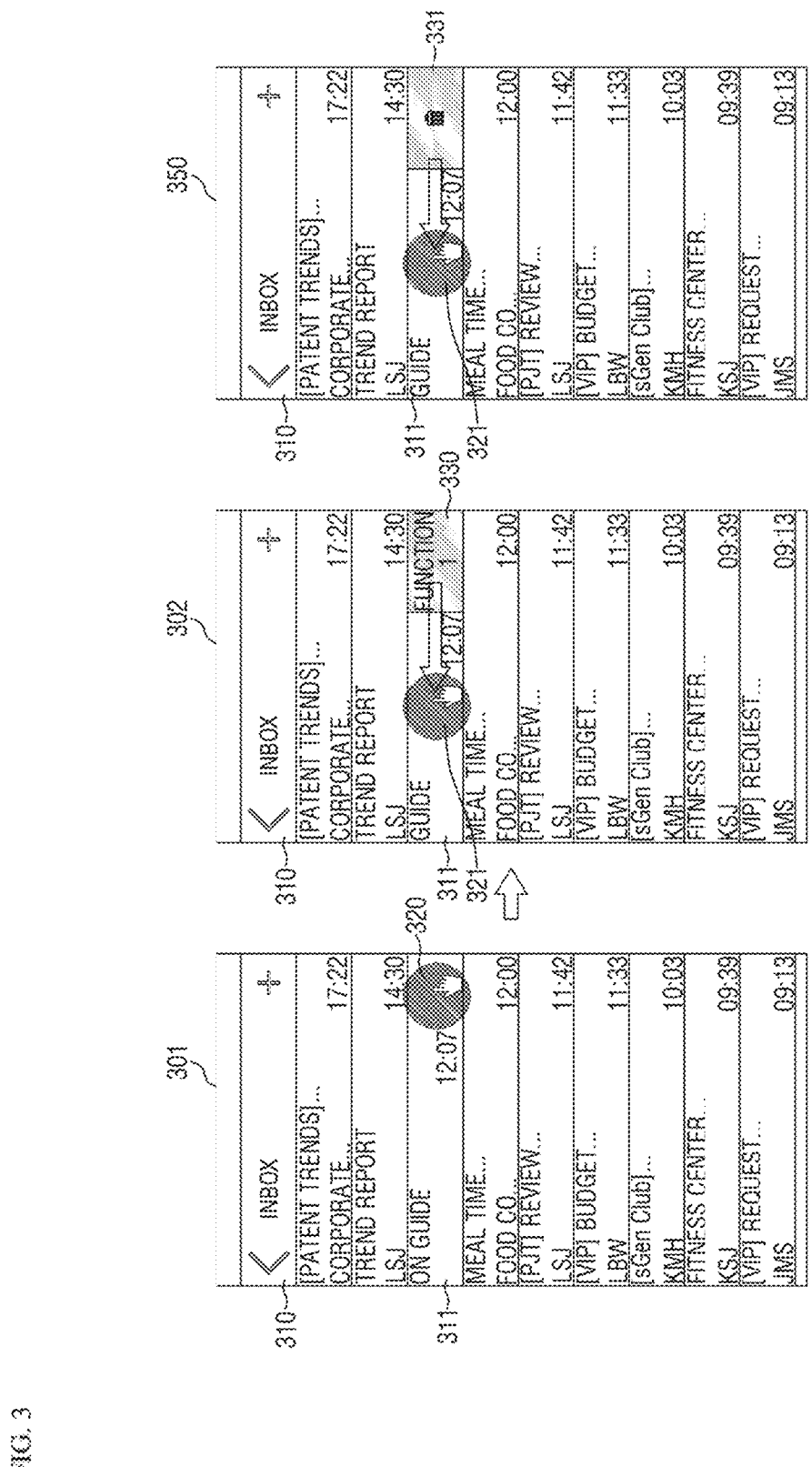
FIG. 3 illustrates an item selected and a menu displayed according to a touch gesture, which are referred to in some embodiments.

FIG. 3 illustrates an item selected and a menu displayed according to a touch gesture, which are referred to in some embodiments. In FIG. 3, screens 301, 302, and 350 showing the received mail list 310 are illustrated as example screens displayed on the display unit 135 by the function execution apparatus. In particular, as an example of the touch gesture in the first direction, a right-to-left swipe touch gesture is illustrated.

Referring to FIG. 3, in operations S20 and S30, when a user inputs a touch gesture 320 to a mail item 311 on the list 310 as shown on the screen 301 and makes a touch gesture 321 in a leftward direction, the function execution apparatus may display the screen 302. Here, the touch gesture 320 and the touch gesture 321 may be successive motions, and the function execution apparatus may sense the touch gestures 320 and 321 as a swipe touch gesture. After sensing the touch gestures 320 and 321 input by the user, the function execution apparatus may determine the mail item 311 to be an execution target of function 1, which is a preset function, and display a menu 330 indicating function 1 on the mail item 311 as shown on the screen 302.

If the preset function is a mail delete function, the function execution apparatus may display the screen 350. Referring to the screen 350, the function execution apparatus may display a menu 331 indicating the preset function on the mail item 311.

Figure 4:
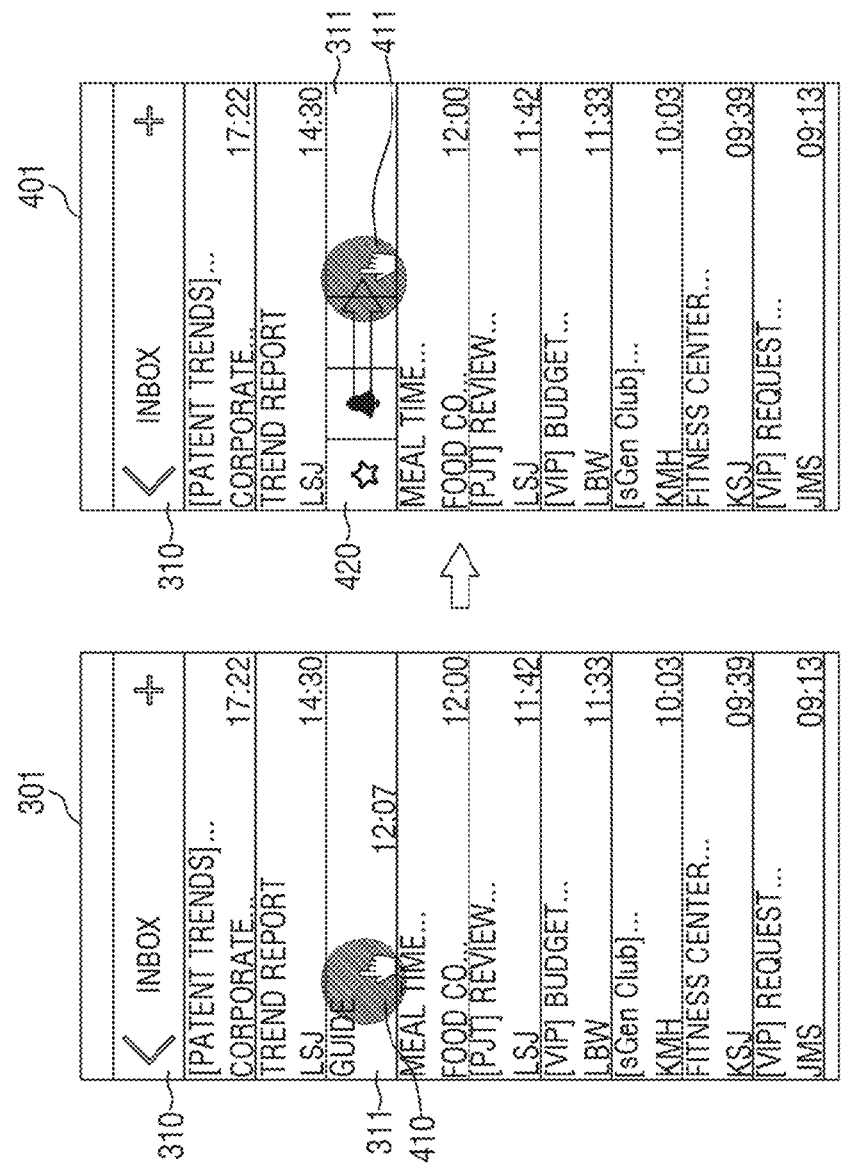
FIG. 4 illustrates another menu displayed according to a touch gesture in another direction, which is referred to in some embodiments.

FIG. 4 illustrates another menu displayed according to a touch gesture in another direction, which is referred to in some embodiments. While a case where the touch gesture in the first direction is a right-to-left swipe touch gesture is illustrated as an example in FIG. 3, the first direction of the inventive concept is not limited to the right-to-left direction. Referring to FIG. 4, when a touch gesture 410 is input on a screen 301 and then a touch gesture 411 is input in a left-to-right direction, the function execution apparatus may display a menu 420 indicating a function preset for a mail item 311 as shown on a screen 401. The menu 420 may include, for example, a set-as-favorite function and an alarm setting function for the mail item 311. That is, the menu 420 indicating the preset function may include a plurality of menus. This will be described in detail later with reference to FIGS. 7 through 9.

According to an embodiment, the embodiments of FIGS. 3 and 4 may be applied simultaneously to the function execution apparatus. That is, the function execution apparatus may display the screen 350 when a touch gesture is input to the item 311 in the right-to-left direction and may display the screen 401 when a touch gesture is input to the item 311 in the left-to-right direction.

Figure 5:
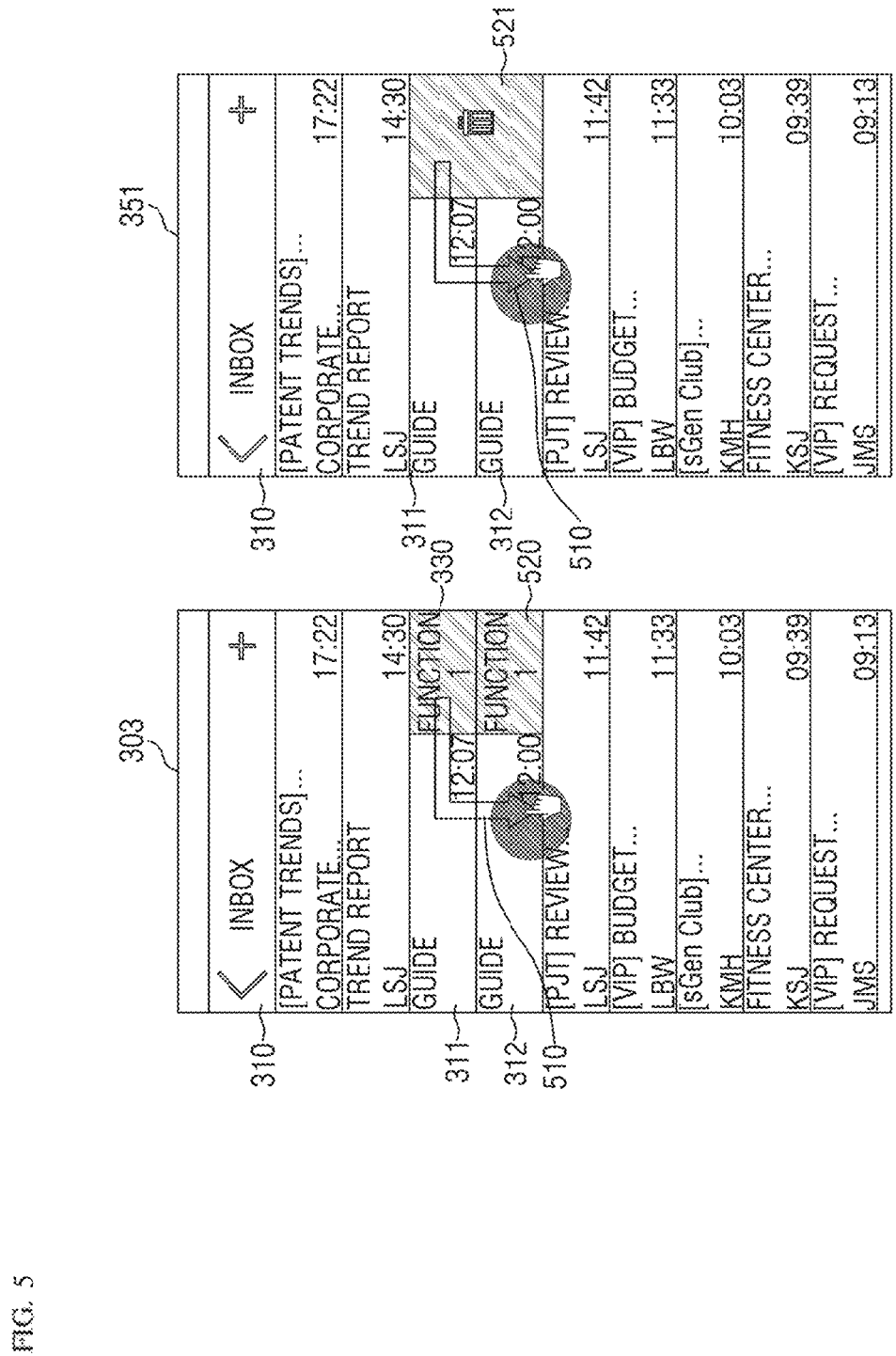
FIG. 5 illustrates a method of selecting an item by changing the direction of a touch gesture, which is referred to in some embodiments.

FIG. 5 illustrates a method of selecting an item by changing the direction of a touch gesture, which is referred to in some embodiments. In FIG. 5, a case where the touch gesture in the second direction is a downward touch gesture is illustrated as an example.

In FIG. 5, in a state where a touch contact by the touch gesture in the first direction is maintained, a downward touch gesture 510 is input in operation S40 in succession to the right-to-left touch gesture input to a mail item 311. That is, the input direction of the touch gesture on the mail item 311 is changed from the leftward direction the downward direction, and the touch contact between the touch gesture and the display unit 135 is maintained in the direction changing process.

Referring to FIG. 5, when a leftward touch gesture is input in operation S30, the function execution apparatus may display a menu 330 indicating function 1 which is a preset function. Then, when the touch gesture 510 is input in operation S40, the function execution apparatus may display, in operation S50, a menu 520 indicating function 1 on an area of a mail item 312 added as an execution target of function 1, as shown on a screen 303.

Specifically, in response to the downward touch gesture 510, the function execution apparatus may display the menu 520 on an area of the mail item 312 corresponding to an area where the menu 330 is displayed, i.e., an area of the mail item 311, As shown on the screen 303, the areas of the mail item 311 and the mail item 312 where the menus 330 and 520 indicating function 1 are displayed may be in contact with each other. Although the menu 330 and the menu 520 are assigned different identification numbers, they may have the same shape.

In another example of the inventive concept, the function execution apparatus may expand the area of the mail item 311 where the menu 330 indicating function 1 is displayed to the area of the mail item 312 in response to the touch gesture 510.

It is assumed that function 1 is a mail delete function. Referring to a screen 351, a menu indicating the delete function displayed on the mail item 311 is expanded to a menu display area of the mail item 312. In this case, the menu display areas of the mail items 311 and 312 may be integrated with each other to display one menu 521.

Figure 6:
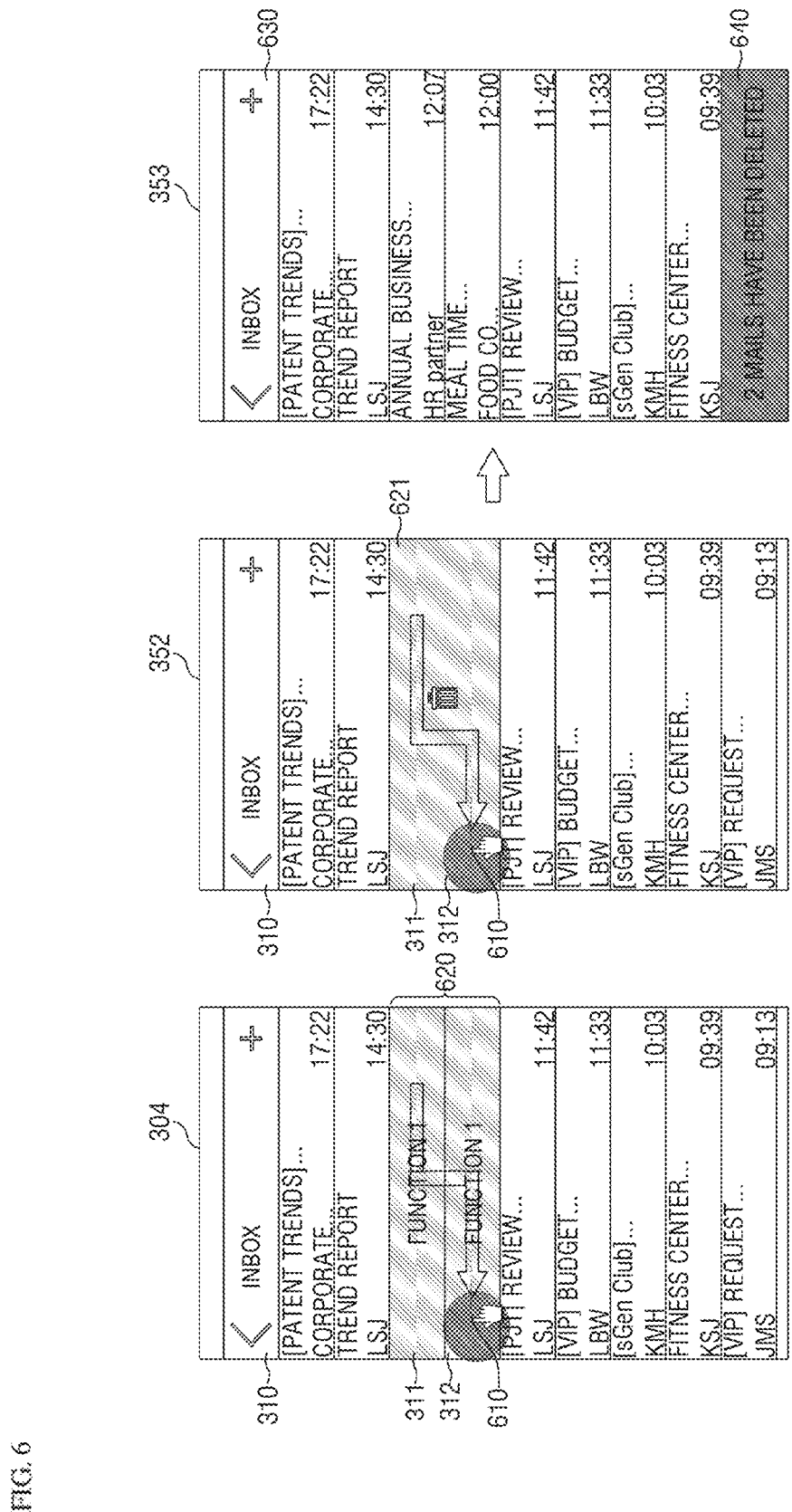
FIG. 6 illustrates a method of executing a function on a selected item, which is referred to in some embodiments.

FIG. 6 illustrates a method of executing a function on a selected item, which is referred to in some embodiments. In particular, in FIG. 6, a case where the touch gesture in the first direction is a right-to-left touch gesture 610 is illustrated as an example.

Referring to FIG. 6, in operation S70, in response to the leftward touch gesture 610 input to a mail item 312 added in operation S50, the function execution apparatus may mark a mail item 311 and the mail item 312, which are execution targets of function 1, as shown on a screen 304. As described above with reference to FIG. 5, the function execution apparatus may independently mark a menu indicating function 1 on an area 620 of each of the mail items 311 and 312 as shown on the screen 304. In addition, if function 1 is a delete function, the function execution apparatus may integrate the areas 620 into one menu display area 621 and mark the menu display area 621 as shown on a screen 352.

The function execution apparatus may identify the sum of the distance of the touch gesture in the first direction input to the mail item 311 in operation S20 and the distance of the touch gesture in the first direction input to the mail item 312 in operation S60. Accordingly, in operation S70, the function execution apparatus may execute the preset function when the sum is equal to or greater than a predetermined distance.

That is, the touch gesture input to the mail item 311 in operation S20 and the touch gesture input the mail item 312 in operation S60 are in the same direction as illustrated in the drawing. It is assumed that the touch gesture was input to the mail item 311 by a first distance in operation S20. That is, the first distance is the distance of a touch gesture input before a downward touch gesture is made to determine the mail item 312 to be an execution target of the preset function. Subsequently, when a user inputs the touch gesture 610 to execute the preset function, the function execution apparatus may sense a second distance by which the touch gesture 610 was input. Here, if the first distance and the second distance are equal to or greater than a predetermined length, the function execution apparatus may control the preset function to be executed. The preset function may be a function preset to be executed in response to a leftward touch gesture input to a single item on the list 310 by a preset distance. That is, the touch gesture must be longer than a predetermined length in order to delete at least the mail item 311.

When the delete function which is the preset function is executed in operation S70, the function execution apparatus may change the displayed screen 352 to a screen 353. That is, the function execution apparatus may display a list 630 from which the mail items 311 and 312 have been deleted. Also, the function execution apparatus may display an announcement 640 to inform about the deletion of the mail items 311 and 312.

Figure 7:
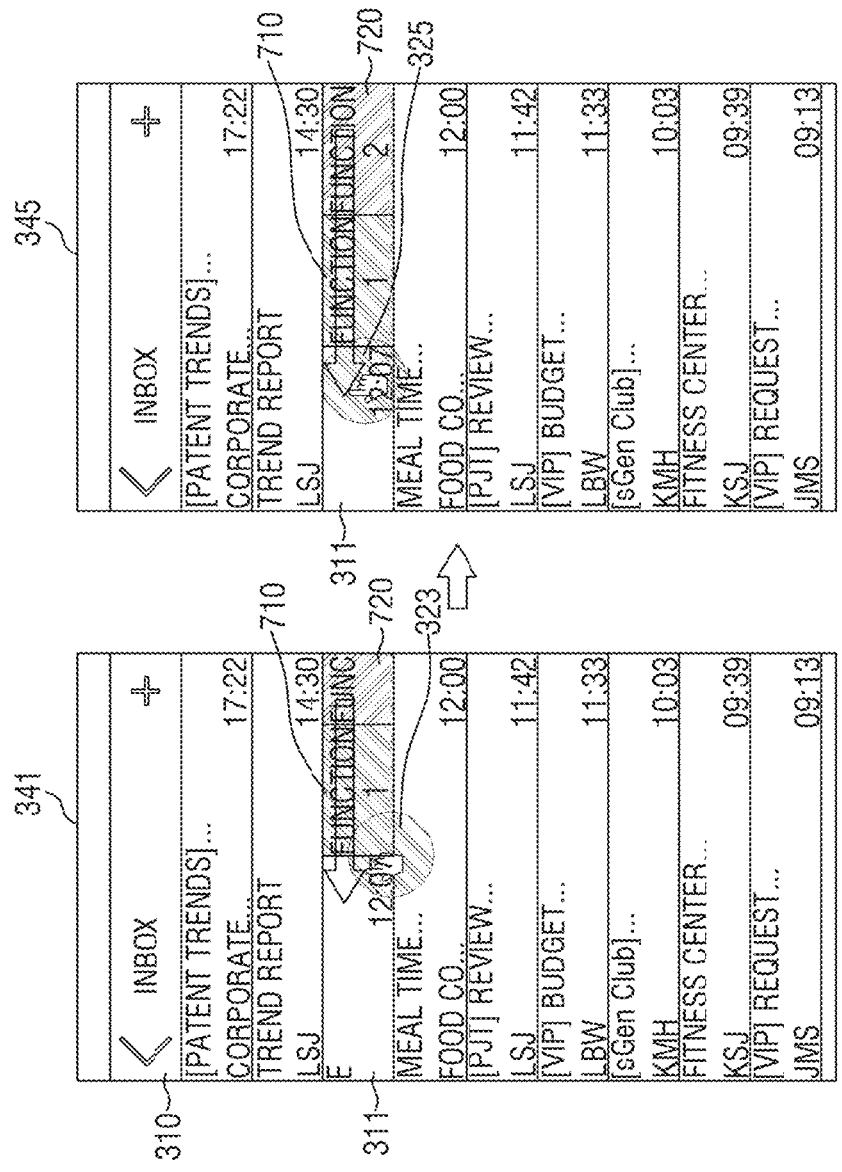
FIG. 7 illustrates a plurality of functions which are referred to in some embodiments.

FIG. 7 illustrates a plurality of functions which are referred to in some embodiments. In FIG. 7, a case where the first direction is the right-to-left direction and where a preset function includes function 1 and function 2 is illustrated as an example.

Referring to FIG. 7, in operation S30, the function execution apparatus may display a plurality of menus 710 and 720 respectively indicating a plurality of preset functions on an area of a mail item 311 in response to a leftward touch gesture 323. At this time, the function execution apparatus may display the menus 710 and 720 according to the length of the touch gesture 323.

When the length of the touch gesture 323 is shorter than a length preset to display the menu 720 indicating function 2, the function execution apparatus may display the menu 710 indicating function 1 but display only part of the menu 720 indicating function 2 according to the length of the touch gesture 323, as shown on a screen 341.

On the other hand, when the length of the touch gesture 323 is equal to or longer than the length preset to display the menu 720 indicating function 2, the function execution apparatus may display the menu 710 indicating function 1 and control the menu 720 indicating function 2 to be slid in the leftward direction (i.e., the first direction) according to the length of the touch gesture 325, as shown on a screen 345.

The function execution apparatus may select any one of the preset functions according to the distance of the leftward touch gesture 323 or 325 input to the mail item 311. For example, when the length (distance) of the touch gesture 323 is short as shown on the screen 341, the function execution apparatus may select function 1 from the preset functions (function 1 and function 2). On the other hand, when the length of the touch gesture 325 is sufficient as shown on the screen 345, the function execution apparatus may select function 2 from the preset functions.

The function execution apparatus may determine the mail item 311 to be an execution target of any one selected function.

For example, it is assumed that function 1 is a delete function and function 2 is a mark-as-read function. When a delete menu displayed but when a mark-as-read menu is not displayed or is only partially displayed in response to the touch gesture 323, the function execution apparatus may select the delete function and determine the mail item 311 to be an execution target of the delete function. On the other hand, when both the delete menu and the mark-as-read menu are displayed in response to the touch vesture 325, the function execution apparatus may select the mark-as-read function and determine the mail item 311 to be an execution target of the mark-as-read function.

Alternatively, according to an embodiment, the function execution apparatus may display all of the menus 710 and 720 in operation S20 in response to the touch gesture in the first direction. Here, a user tray select any one of the menus 710 and 720. Accordingly, when a second item is added in operation S50, the function execution apparatus may determine the added second item to be an execution target of a function indicated by the menu selected by the user. Here, the touch gesture in the second direction may be input in a state where the touch contact is released after the touch gesture in the first direction is input. That is, there may be the user's menu selection input between the touch gesture the first direction and the touch gesture in the second direction.

Figure 8:
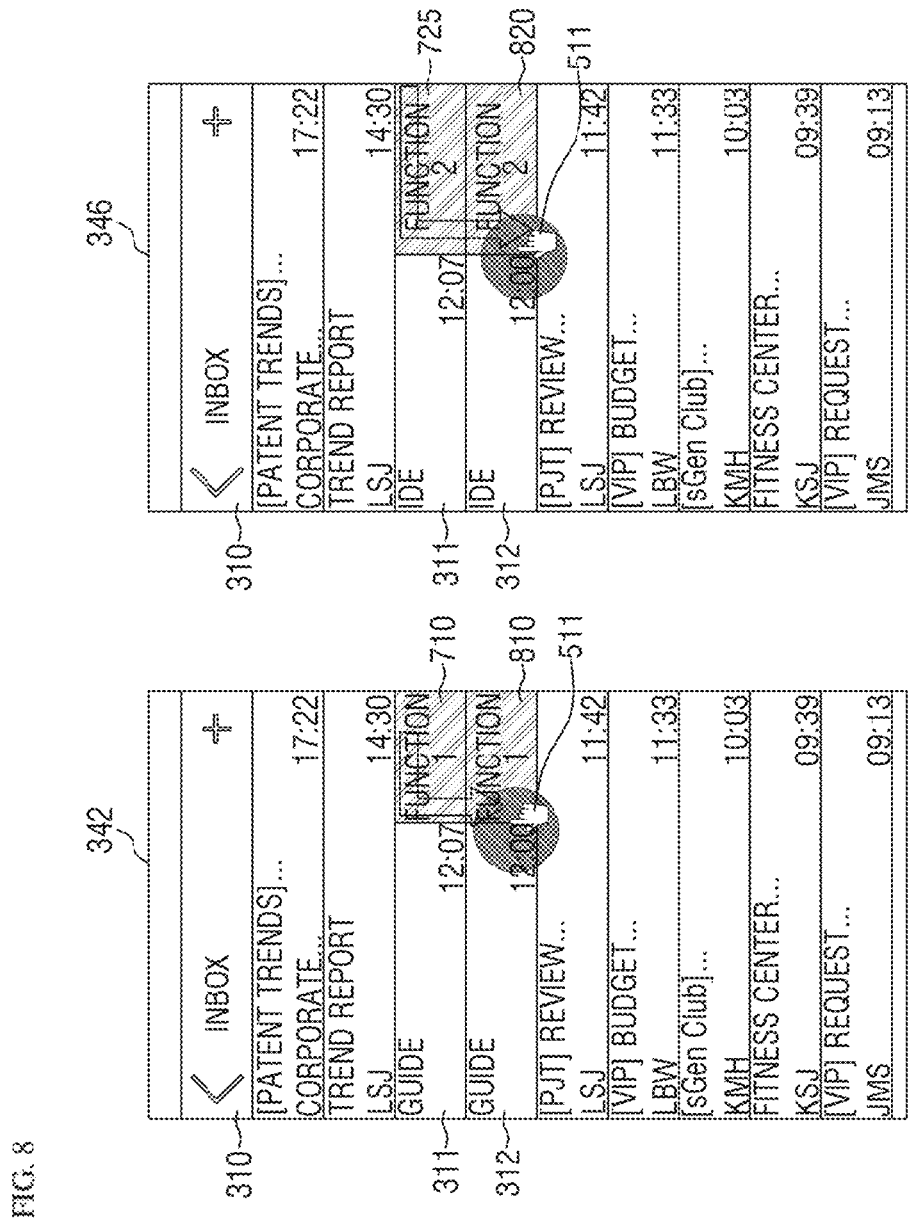
Figure 9B:
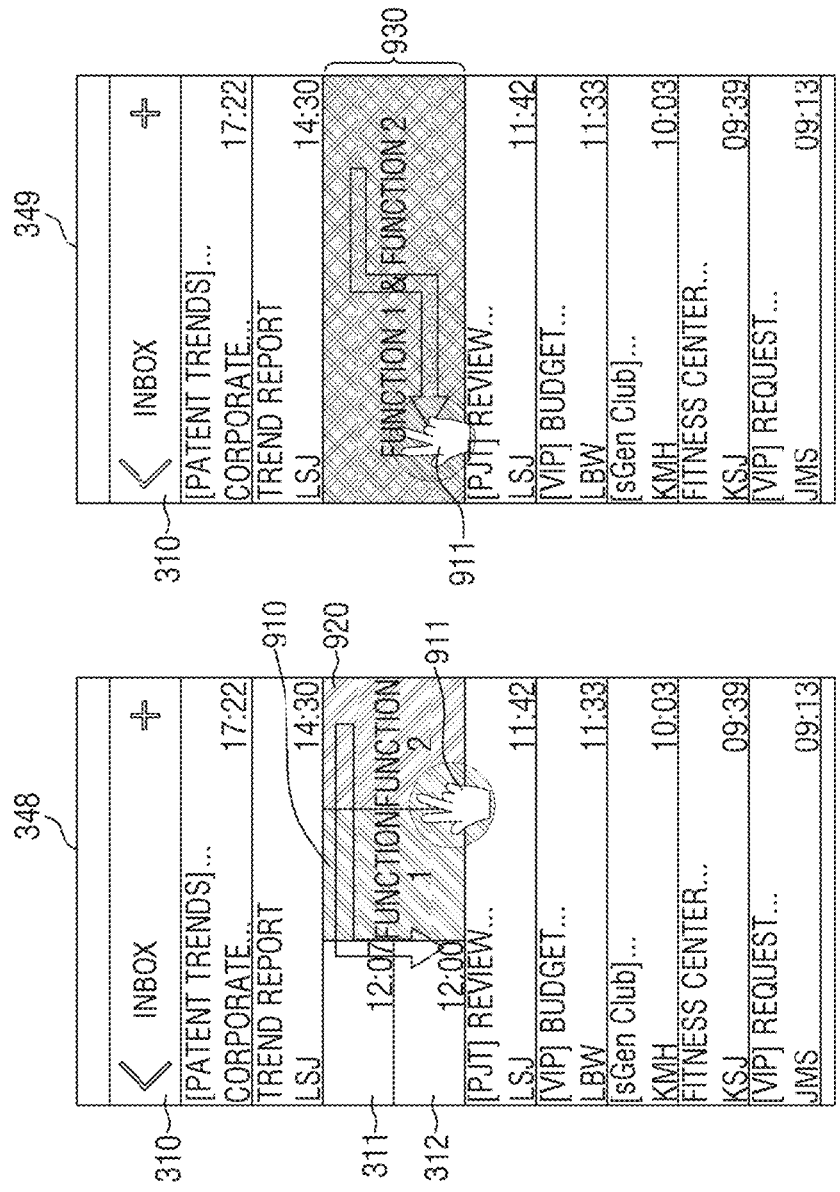

FIGS. 8, 9A and 9B illustrate a method of executing each of a plurality of functions in response to a touch gesture, which is referred to in some embodiments. In FIGS. 8, 9A and 9B, a case where the touch gesture in the first direction is a leftward touch gesture and where the touch gesture in the second direction is a downward touch gesture is illustrated as an example. Embodiments to be described with reference to FIGS. 8, 9A and 9B are example operations performed by the function execution apparatus after the embodiment of FIG. 7.

Referring to FIG. 8, in a state where only the delete menu 710 is displayed as shown on the screen 341 of FIG. 7, if a downward touch gesture 511 is input in succession to the leftward touch gesture, the function execution apparatus may determine a mail item 312 to be an execution target of a delete function in operation S50, as shown on a screen 342. Here, the function execution apparatus may display a delete menu 810 on the mail item 312 (i.e., an execution target of the delete function) to be adjacent to the delete menu 710, as shown on the screen 342.

Referring to FIG. 9A, in operation S70, when receiving a leftward touch gesture 611, the function execution apparatus executes the delete function on the mail items 311 and 312 as shown on a screen 343.

According to an embodiment, the function execution apparatus may also display both a delete menu and a mark-as-read menu in response to the touch gesture 325, as shown on the screen 345 of FIG. 7. In this state, referring to FIG. 8, if the downward touch gesture 511 is input in succession to the leftward touch gesture, the function execution apparatus may determine the mail item 312 to be an execution target of a mark-as-read function as shown on a screen 346. Here, the function execution apparatus may display a mark-as-read menu 820 on the mail item 312 (i.e., an execution target of the mark-as-read function) to be adjacent to a mark-as-read menu 725, as shown on the screen 346. The mark-as-read menu 725 on the mail item 311 is illustrated differently from the mark-as-read menu 720 on the screen 345 of FIG. 7. That is, when the mail item 311 is determined to be an execution target of the mark-as-read function by the touch gesture 325 of FIG. 7, the function execution apparatus may expand the menu 720 to an area where the menu 710 was displayed. As a result, the menu 725 may be displayed as illustrated in FIG. 8.

Referring to FIG. 9A, in operation S70, when receiving a leftward touch gesture 612, the function execution apparatus executes the mark-as-read function on the mail items 311 and 312 as shown on a screen 347. Here, the length of the touch gesture 612 may be shorter than the length of the touch gesture 611. This is because the leftward touch gesture 325 for selecting a function was longer than the touch gesture 323 in FIG. 7.

In operation S70, as shown on the screen 347, the function execution apparatus may mark the mail items 311 and 312 as indicated by reference numeral 625 to show that the mail items 311 and 312 are execution targets of the mark-as-read function.

In FIGS. 8 and 9A, a case where any one function is determined to be executed in response to the touch gesture 323 or the touch gesture 325 has been mainly described. According to an embodiment, the function execution apparatus may also execute a plurality of functions at the same time. This will now be described with reference to FIGS. 7, 8, and 9B.

In FIG. 7, it is assumed that both the delete menu and the mark-as-read menu are displayed by the touch gesture 325. In this case, the function execution apparatus may select both the mark-as-read function and the delete function and determine the mail item 311 to be an execution target of the mark-as-read function and the delete function. Here, if the downward touch gesture 511 is input in succession to the touch gesture 325 as described above with reference to FIG. 8, the function execution apparatus may also determine the mail item 312 to be an execution target of the mark-as-read function and the delete function. Then, when receiving a leftward touch gesture, the function execution apparatus may execute the mark-as-read function and the delete function on the mail items 311 and 312.

Alternatively, according to an embodiment, a plurality of functions may be determined to be executed when a preset touch input is received after the touch gesture 325 is input, instead of when the downward touch gesture 511 is input in succession to the touch gesture 325.

Referring to FIG. 9B, after the touch gesture 325 of FIG. 7, the function execution apparatus may receive a touch input on areas where menus indicating respective functions are displayed. That is, the above preset touch input may be a two-point touch gesture 911 performed on areas 910 and 920 which display respective menus, as shown on a screen 348 of FIG. 9B. The two-point touch gesture 911 may be input as one-point touch gestures on the area 910 and the area 920 displaying the respective menus.

As described above with reference to FIG. 7, the function execution apparatus may display a menu indicating the mark-as-read function and a menu indicating the delete function in response to the touch gesture 325.

Referring again to FIG. 9B, when one-point touch gestures constituting the two-point touch gesture 911 are input respectively to the area 910 and the area 920 of the mail item 311, the function execution apparatus may determine the mail item 311 to be an execution target of the mark-as-read function and the delete function. When the input two-point touch gesture 911 continues in the downward direction while the touch contact is maintained, the function execution apparatus may add the mail item 312 as an execution target of the mark-as-read function and the delete function, as shown on the screen 348.

Next, after the mail item 312 is added as the execution target of the mark-as-read function and the delete function, if the two-point touch gesture 911, which was being input in the downward direction, continues in the leftward direction as shown on a screen 349, the function execution apparatus may execute the mark-as-read function and the delete function on the mail item 311 and the mail item 312.

In an embodiment, when a leftward touch gesture is input on the screen 348, the function execution apparatus may execute only one of the functions depending on whether the two-point touch gesture 911 is maintained.

For example, after the two-point touch gesture 911 is input in the leftward direction and then in the downward direction up to the mail item 312 on the screen 348, a one-point touch contact be released. Alternatively, while the two-point touch vesture 911 is being continuously input in the leftward direction on the mail item 312, a one-point touch contact may be released. In either case, the function execution apparatus may execute only one of the mark-as-read function and the delete function and cancel the execution of the other function.

To this end, the function execution apparatus may sense the release of the touch contact of any one-point touch gesture from a trajectory along which the two-point touch gesture 911 is input in the downward direction or a trajectory along which the two-point touch gesture 911 is input in the leftward direction after being input in the downward direction. The function execution apparatus may determine a function to be canceled based on the position at which the touch contact of the one-point touch gesture is released.

Figure 10:
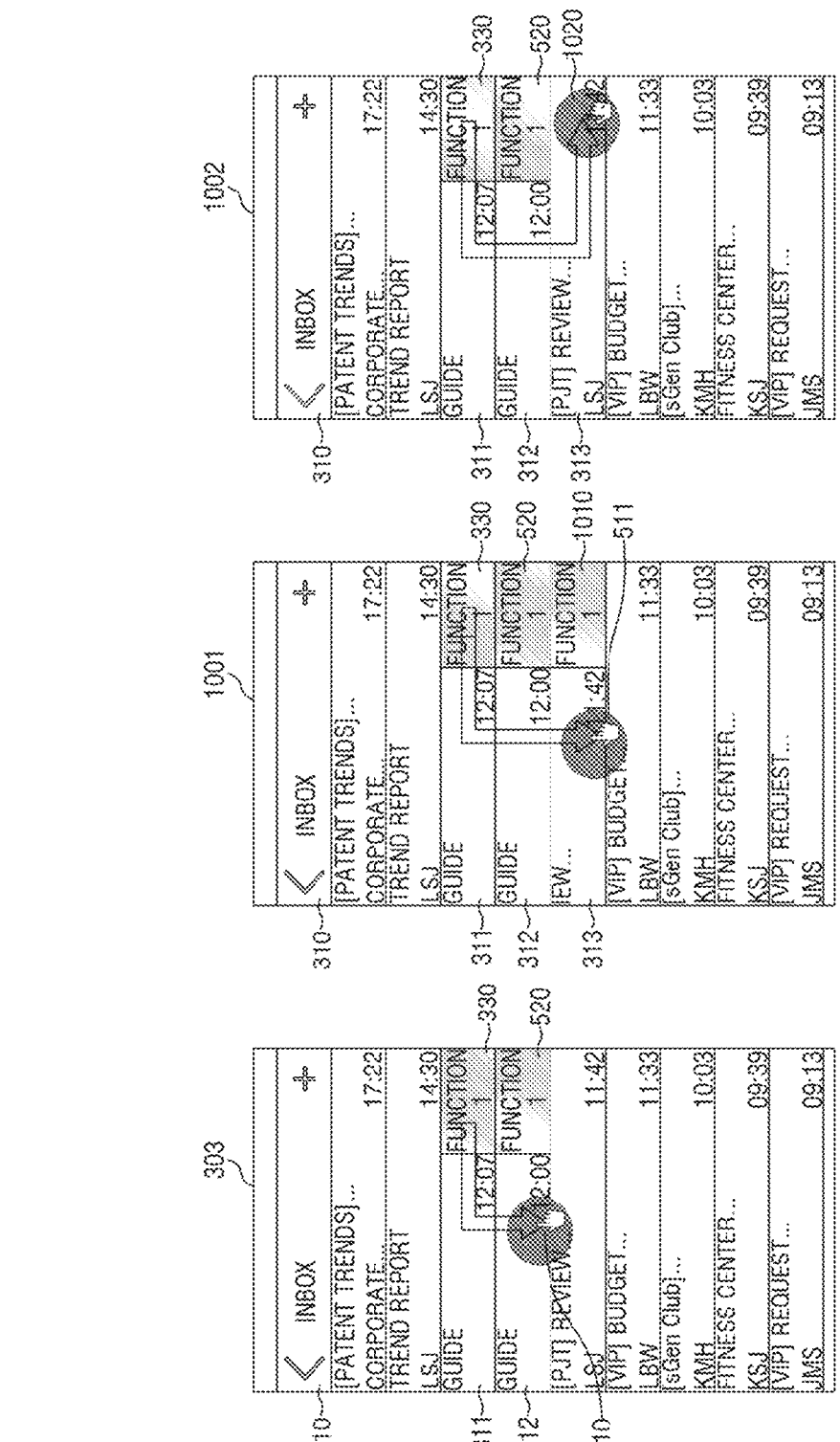
FIG. 10 illustrates a method of releasing a selected item according to an embodiment.

FIG. 10 illustrates a method of releasing a selected item according to an embodiment. In FIG. 10, a case where the touch gesture in the second direction is a downward touch gesture and a third direction is an opposite direction (e.g., a rightward direction) to the first direction is illustrated as an example.

Referring to FIG. 10, in operation S50, in a state where a touch input by a downward touch gesture is maintained, the function execution apparatus may receive a rightward touch gesture successive to the downward touch gesture.

The function execution apparatus may exclude a mail item 313 to which the rightward touch gesture was input from execution targets of a preset function.

Referring to a screen 303, in operation S50, an execution target of function 1, which is a preset function, is added by a touch gesture 510. If the touch vesture 510 continues in the downward direction to pass the mail item 313 like a touch gesture 511, the function execution apparatus may add the mail item 313 as an execution target of function 1, as shown on a screen 1001. Accordingly, the function execution apparatus may display a menu 1010 indicating function 1 on an area of the mail item 313.

Next, in a state where a touch contact on the mail item 313 by the touch gesture 511 is maintained, the direction of the touch gesture 511 may be changed from the downward direction to the rightward direction to input a touch gesture 1020.

Here, the function execution apparatus may sense that the touch gesture 1020 proceeds in the opposite direction to the leftward touch gesture for determining a mail item 311 to be an execution target of function 1. When sensing the touch gesture of the opposite direction on the mail item 313, the function execution apparatus may exclude the mail item 313 from execution targets of function 1 as shown on a screen 1002.

In FIG. 10, the rightward direction is illustrated as an example of the third direction. However, according to an embodiment, the third direction may also be the opposite direction to the second direction, that is, an upward direction. In this case, the function execution apparatus may exclude the mail item 313 from execution targets of a preset function when receiving an upward touch gesture on the mail item 313.

Figure 11:
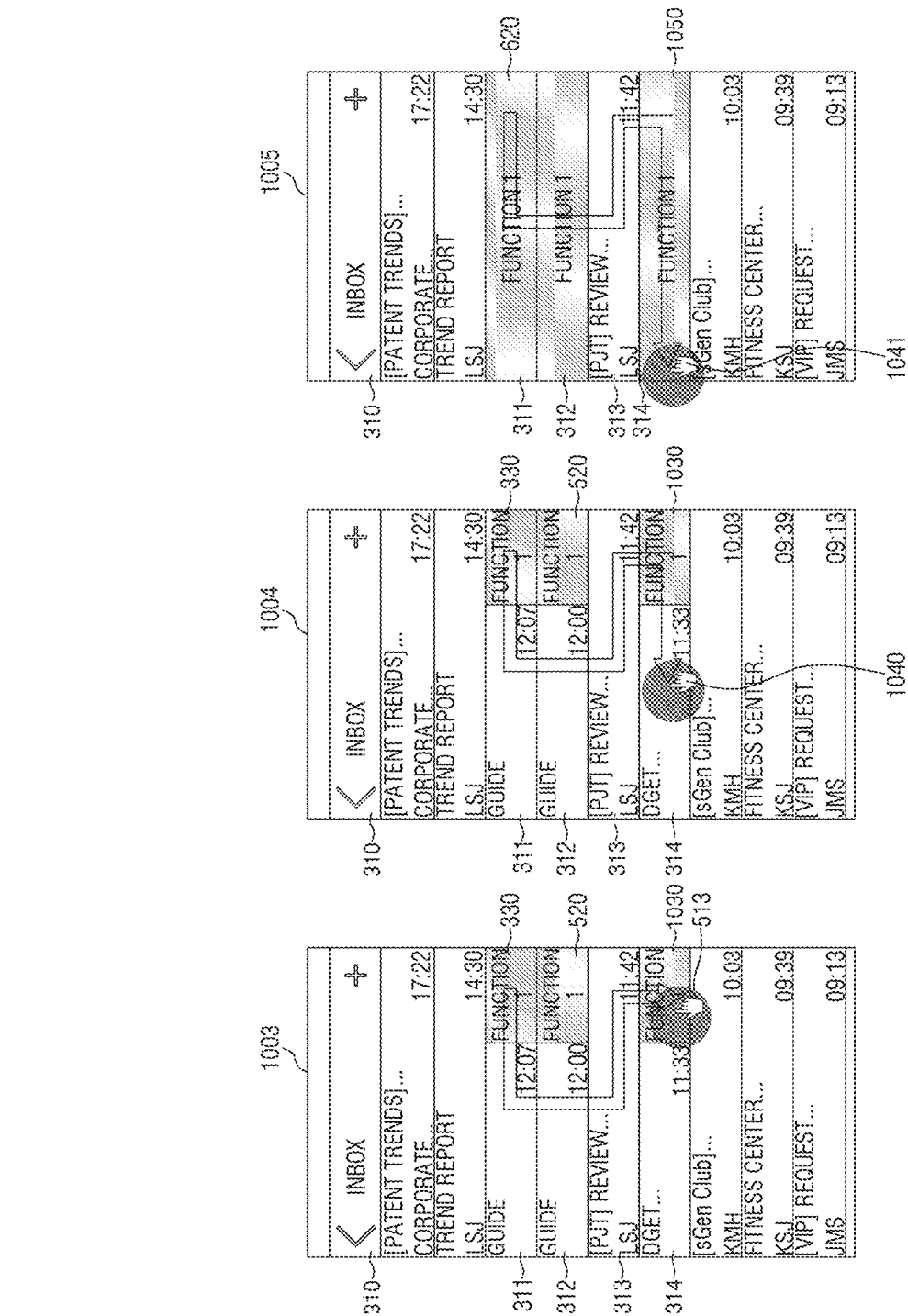
FIG. 11 illustrates a method of selecting items separated from each other according to an embodiment.

FIG. 11 illustrates a method of selecting items separated from each other according to an embodiment. In FIG. 11, a case where the first direction is the leftward direction, the second direction is the downward direction, and the third direction is the rightward direction is illustrated as an example. In addition, an embodiment to be described with reference to FIG. 11 is an example operation performed by the function execution terminal after the embodiment of FIG. 10.

After the mail item 313 is excluded from the execution targets of function 1 in FIG. 10, the function execution terminal may, in a state where a touch contact by the rightward touch gesture is maintained, receive a downward touch gesture 513 on a mail item 314, which is successive to the rightward touch gesture, as shown on a screen 1003.

Accordingly, the function execution apparatus may add the mail item 314 as an execution target of function 1. In addition, the function execution apparatus may display a menu 1030 indicating function 1 on an area of the mail item 314 in order to inform that the mail item 314 is an execution target of function 1.

Next, in a state where a touch contact by the downward touch gesture 513 is maintained, the function execution apparatus may receive a leftward touch gesture 1040 on the mail item 314, which is successive to the downward touch gesture 513, as shown on a screen 1004.

In response to the leftward touch gesture 1040 input to the mail item 314, the function execution apparatus may execute function 1 on the mail items 311, 312 and 314. In particular, the function execution apparatus may execute function 1 on the mail items 311, 312 and 314 as shown on a screen 1005 when the length of the touch gesture 1040 is equal to or greater than a predetermined length as indicated by reference numeral 1041. In addition, the function execution apparatus may mark the mail item 314 as indicated by reference numeral 1050 to show that the mail item 314 is an execution target of function 1. Here, the mail item 314 may be marked separately from the mail items 311 and 312 marked as indicated by reference numeral 620 to show that the mail items 311 and 312 are execution targets of function 1.

Figure 12:
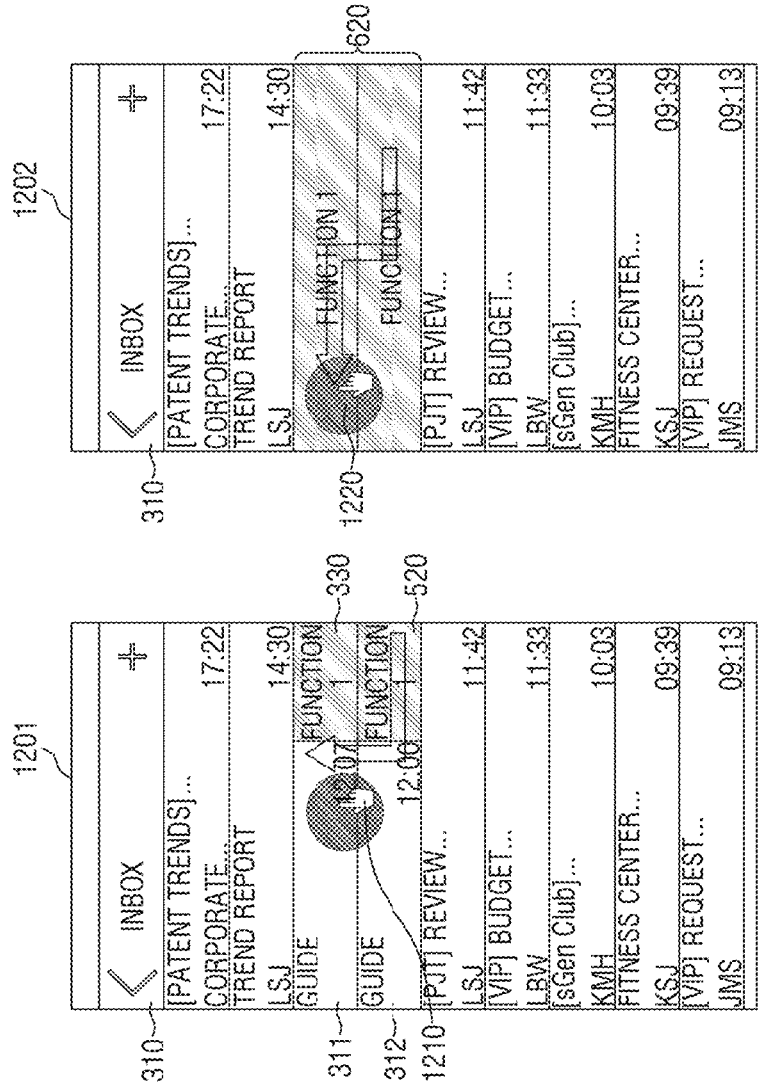
FIG. 12 illustrates a method of executing a function in response to a touch gesture in another direction, which is referred to in some embodiments.

FIG. 12 illustrates a method of executing a function in response to a touch gesture in another direction, which is referred to in some embodiments. In FIG. 12, a case where the second direction is the upward direction and where the first direction is the leftward direction is illustrated as an example.

While a case where the touch gesture in the second direction is a downward touch gesture has been mainly described above, embodiments of the inventive concept are not limited to this case.

Referring to FIG. 12, when an upward touch gesture 1210 is input in a state where a mail item 312 has been determined to be an execution target of function 1 on a screen 1201, the function execution apparatus may add a mail item 311 as an execution target of function 1. Referring to a screen 1202, the function execution apparatus may execute function 1 on the mail items 311 and 312 in response to a leftward touch gesture 1220.

The methods according to the embodiments described above with reference to the attached drawings can be performed by the execution of a computer program implemented as computer-readable code. The computer program may be transmitted from a first computing device to a second computing device through a network, such as the Internet, to be installed in the second computing device and thus can be used in the second computing device. Examples of the first computing device and the second computing device include fixed computing devices such as a server and a desktop PC and mobile computing devices such as a notebook computer, a smartphone and a tablet PC.

According to the inventive concept, it is possible to provide a method of selecting a plurality of items on a list without repeatedly inputting a touch gesture to each of the items.

According to the inventive concept, it is also possible to execute the same function on the selected items without releasing the touch contact of an input touch gesture.

According to the inventive concept, it is also possible to easily select a plurality of items separated from each other from the items on the list by changing the direction of a touch gesture.

According to the inventive concept, it is also possible to execute the same function on a plurality of items separated from each other among the items on the list.

What is claimed is:

1. A method of executing a function on a plurality of items on a list, the method comprising:
    receiving a touch gesture in a first direction on a first item on a list;
    determining the first item to be a first execution target of a preset function in response to the touch gesture in the first direction on the first item;
    receiving a touch gesture in a second direction on a second item;
    adding the second item as a second execution target of the preset function in response to the touch gesture in the second direction on the second item;
    receiving a touch gesture in the first direction on the second item, wherein the touch gesture in the first direction on the second item is successive to the touch gesture in the second direction on the second item;
    updating display of the first item and the second item to display the indicator of the preset function during the touch gesture in the first direction on the second item; and
    executing the preset function on the first item and the second item in response to detecting the end of the touch gesture in the first direction on the second item,
    wherein, the touch gesture in the first direction on the second item is received while a touch contact comprising the touch gesture in the second direction on the second item is maintained,
    wherein, the first direction is a direction of exposing a menu indicating the preset function.

2. The method of claim 1, wherein the touch gesture in the second direction on the second item is successive to the touch gesture in the first direction on the first item, and is received while a touch contact comprising the touch gesture in the first direction on the first item is maintained.

3. The method of claim 1, wherein the executing of the preset function comprises executing the preset function in response to the sum of a distance of the touch gesture in the first direction on the first item and a distance of the touch gesture in the first direction on the second item being equal to or greater than a preset distance.

4. The method of claim 1, wherein the determining of the first item to be the first execution target of the preset function comprises displaying a menu indicating the preset function on an area of the first item in response to the touch gesture in the first direction on the first item, and
    wherein the adding of the second item comprises displaying the menu on an area of the second item in response to the second item being added.

5. The method of claim 4, the menu on the area of the second item corresponds to the area of the first item.

6. The method of claim 4, wherein the displaying of the menu on the area of the second item comprises expanding the area of the first item to the area of the second item in response to the touch gesture in the second direction on the second item.

7. The method of claim 1, wherein the executing of the preset function on the first item and the second item comprises marking the first item and the second item in response to the touch gesture in the first direction on the second item.

8. The method of claim 1, wherein the determining of the first item to be the first execution target of the preset function comprises:
    displaying a plurality of menus respectively indicating a plurality of preset functions on an area of the first item in response to the touch gesture in the first direction on the first item;
    selecting the preset function from the plurality of preset functions based on a distance of the touch gesture in the first direction on the first item; and
    determining the first item to be the first execution target of the selected preset function.

9. The method of claim 8, wherein the adding of the second item as the second execution target of the preset function comprises determining the second item to be the second execution target of the selected preset function.

10. The method of claim 1, wherein the adding of the second item as the second execution target of the preset function comprises:
    receiving a touch gesture in a third direction on the second item, wherein the touch gesture in the third direction on the second item is successive to the touch gesture in the second direction on the second item, and is received while a touch input comprising the touch gesture in the second direction on the second item is maintained; and
    excluding the second item from execution targets of the preset function.

11. The method of claim 10, wherein the excluding of the second item from the execution targets of the preset function comprises:
    receiving a touch gesture in the second direction on a third item, the touch gesture in the second direction on the third item being successive to the touch gesture in the third direction on the second item; and
    adding the third item as a third execution target of the preset function.

12. The method of claim 11, wherein the adding of the third item as the third execution target of the preset function comprises:
    receiving a touch gesture in the first direction on the third item, the touch gesture in the first direction on the third item being successive to the touch gesture in the second direction on the third item; and executing the preset function on the first item, the second item and the third item in response to the touch gesture in the first direction on the third item.

13. An apparatus for executing a function on a plurality of items on a list, the apparatus comprising:
- a display unit configured to display a list comprising one or more items; and
- a control unit configured to:
  - determine a first item on the list to be a first execution target of a preset function when a touch gesture in a first direction on the first item is input through the display unit,
  - add a second item as a second execution target of the preset function when a touch gesture in a second direction on the second item is input through the display unit, and
  - in response to a touch gesture in the first direction on the second item, update display of the first item and the second item to display the indicator of the preset function during the touch gesture in the first direction on the second item and control the preset function to be executed on the first item and the second item in response to detecting the end of the touch gesture in the first direction on the second item, wherein the touch gesture in the first direction on the second item is successive to the touch gesture in the second direction on the second item, and is received while a touch contact comprising the touch gesture in the second direction on the second item is maintained, wherein, the first direction is a direction of exposing a menu indicating the preset function.

14. The apparatus of claim 13, wherein the touch gesture in the second direction on the second item is successive to the touch gesture in the first direction on the first item, and is made while a touch contact comprising the touch gesture in the first direction on the first item is maintained.

* * * * *